Patented May 19, 1936

2,040,916

UNITED STATES PATENT OFFICE 2,040,916

ADHESIVE

Niels Holger Bjerg, Chicago, Ill., assignor to A. B. Dick Company, Chicago, Ill., a corporation of Illinois No Drawing. Application August 8, 1934, Serial No. 738,933

4 Claims. (Cl. 154—40)

This invention relates to adhesive and provides a method for joining or securing together two surfaces, either or both of which contain a cellulose derivative.

Heretofore, difficulty has been experienced in obtaining suitable adhesives for moisture-proof cellulistic sheets, including sheets of regenerated cellulose such as are identified commercially as "Cellophane" and "Sylphrap" and cellulose acetate sheets identified as "Kodapak", since ordinary water-soluble adhesives which have heretofore been available do not stick to the surface coating of such moisture-proof sheets. My invention provides an adhesive for such moisture-proof material, either for sealing together different surfaces of the material as in sealing a wrapper of cellulistic material or in securing to such material a dissimilar material such, for example, as a label. By my invention, an adhesive is provided which softens the surface of the cellulistic material and forms a film which fuses with the softened surface. On drying, this film becomes integral with the cellulistic material to which it has been applied.

In carrying out my invention, I form a collodion solution, i. e., a solution comprising a cellulose compound and a suitable volatile solvent, or mixture of solvents, and add thereto a softener and a viscous oil, cutting the resulting solution as required by the addition of a suitable thinner. The ingredients used may be widely varied and, of course, the proportions of the ingredients will vary accordingly.

As a softener, I prefer to use a relatively non-volatile solvent for the cellulose compound, and as a viscous oil, an oil capable of combining with the cellulose compound to form a tacky film. Specifically, for the solvent softener, I prefer to use dibutyl phthalate, and for the oil, I prefer to use castor oil. Many other ingredients, however, may be substituted for the preferred ingredients, as will be readily apparent to those skilled in the art. Thus, for example, in place of dibutyl phthalate, other phthalates, such as amyl, ethyl, and butyl phthalate, or butyl tartarate, tricresyl phosphate and the like may be substituted. In place of castor oil, other suitable non-drying or semi-drying oils which form tacky films with nitrocellulose may be used. Thus, I have found that very satisfactory results may be obtained using corn oil, and that a workable composition may be obtained when arachis oil is used.

I have found that good results may be obtained from a composition comprising a collodion solution made up of nitrocotton (½ second) and suitable solvents therefor, such as butyl and ethyl acetate and butyl and ethyl alcohol, dibutyl phthalate, and castor oil. Other nitrocotton, such as 15 second cotton, may be used, but I prefer the ½ second variety, since it requires the addition of less solvent and oil. The castor oil known commercially as Baker's No. 30 I have found to be satisfactory.

Using the specific ingredients I have mentioned, the respective proportions of collodion solution, softener, and oil, may be varied substantially as follows:

| | Parts by weight |
|---|---|
| Collodion solution | 150 to 450 |
| Softener | 6 to 36 |
| Oil | 15 to 150 |

I have found that the following formula, using the stated ingredients in substantially the following proportions, gives highly satisfactory results:

(1) A basic collodion solution is made up consisting of

| | Parts by weight |
|---|---|
| Nitrocotton (½ second) | 60 |
| Butyl acetate | 20 |
| Ethyl acetate | 120 |
| Butyl alcohol | 20 |
| Ethyl alcohol | 100 |

(2) The basic solution is softened by adding thereto

| | Parts |
|---|---|
| Dibutyl phthalate | 19½ |

(3) To the resulting mixture of softened basic solution is added

| | Parts |
|---|---|
| Castor oil (Baker's No. 30) | 120 |

(4) The viscous solution which results is thinned to the desired consistency by adding

| | Parts |
|---|---|
| A 50–50 mixture of ethyl alcohol and toluene | 75 more or less as required |

The resulting adhesive is thin enough for application by a brush or may be applied successfully in ordinary gumming machines.

As previously stated and as will be apparent to those skilled in the art, various oils other than castor oil may be used, for example, corn oil, or arachis oil. If either of the latter or similar oils are used, it is desirable to add a small amount of hydrocarbon solvent, such as toluol, or a similar solvent. The following example, wherein the proportions are by weight, illustrates such a composition:

| | Parts by weight |
|---|---|
| Collodion solution | 100 |
| Dibutyl phthalate | 6⅓ |
| Corn oil | 20 |
| Toluol | 10 |

If arachis oil is used, it is desirable to increase the proportion of toluol or similar solvent to say thirty parts of solvent.

The ratio of the ingredients should be varied to accord with the particular oil used. For example, a corn oil and arachis oil are soluble in toluene but are not soluble in alcohol, and therefore the ratio of toluene to alcohol will be high where these particular oils are used. Too much toluene should not be used in combination with nitrocotton, since it will precipitate the latter. The correct ratio of thinner will depend upon the particular ingredients used and may be readily determined in each case.

The film formed by my composition has the advantage of being transparent. It, therefore, does not impair the appearance of materials to which it is applied, and is particularly suited for application to transparent materials.

What I claim is:

1. A method of sealing or joining moisture-proof cellulistic materials, including sheets of regenerated cellulose and of cellulose acetate coated with a waterproof composition, to like or dissimilar material, which comprises applying to at least one of the materials to be united an adhesive comprising as essential ingredients nitrocellulose, a solvent plasticizer for the nitrocellulose, an oil compatible with the nitrocellulose and adapted to form a tacky mass therewith, and solvents for nitrocellulose, which forms, when set, a flexible transparent film fused with the surface of the cellulistic material, and uniting the materials.

2. A method of sealing or joining moisture-proof cellulistic materials, including sheets of regenerated cellulose and of cellulose acetate coated with a waterproof composition, to like or dissimilar material, which comprises applying to at least one of the materials to be united an adhesive comprising as essential ingredients nitrocellulose, a solvent plasticizer for the nitrocellulose, an oil compatible with the nitrocellulose and adapted to form a tacky mass therewith, and solvents for nitrocellulose, which forms, when set, a flexible transparent film fused with the surface of the cellulistic material, the oil being present in an amount at least equal by weight to the amount of nitrocellulose, and uniting the materials.

3. A method of sealing or joining moisture-proof cellulistic materials, including sheets of regenerated cellulose and of cellulose acetate coated with a waterproof composition, to like or dissimilar material, which comprises applying to at least one of the materials to be united an adhesive comprising as essential ingredients nitrocellulose, a solvent plasticizer for the nitrocellulose, a non-drying vegetable oil, and solvents for nitrocellulose, which forms, when set, a flexible transparent film fused with the surface of the cellulistic material, the oil being present in an amount at least equal by weight to the amount of nitrocellulose, and uniting the materials.

4. A method of sealing or joining moisture-proof cellulistic materials, including sheets of regenerated cellulose and of cellulose acetate coated with a waterproof composition, to like or dissimilar material, which comprises applying to at least one of the materials to be united an adhesive comprising as essential ingredients nitrocellulose, a solvent plasticizer for the nitrocellulose, castor oil, and solvents for nitrocellulose, which forms, when set, a flexible transparent film fused with the surface of the cellulistic material, the solvent plasticizer amounting to one-third the amount of nitrocellulose by weight and the oil amounting to twice the amount of nitrocellulose by weight, and uniting the materials.

NIELS HOLGER BJERG.